(12) United States Patent
Chiu (10) Patent No.: US 7,510,175 B2
(45) Date of Patent: Mar. 31, 2009

(54) ASSISTING EJECTION DEVICE FOR HATCH OF HATCHBACK

(75) Inventor: Pei-Cheng Chiu, Kaohsiung (TW)

(73) Assignee: Mei Hwa Technology Corp., Kaohsiung (TW)

( * ) Notice: Subject to any disclaimer, the term of this patent is extended or adjusted under 35 U.S.C. 154(b) by 304 days.

(21) Appl. No.: 11/627,990

(22) Filed: Jan. 29, 2007

(65) Prior Publication Data

US 2008/0179800 A1  Jul. 31, 2008

(51) Int. Cl.
*B60G 11/14* (2006.01)
*F16M 1/00* (2006.01)

(52) U.S. Cl. .................. 267/249; 267/121; 267/174; 188/371; 248/637

(58) Field of Classification Search .......... 267/174, 267/175, 177, 178, 136, 116, 121, 195, 249; 188/371, 377; 248/562, 637
See application file for complete search history.

(56) References Cited

U.S. PATENT DOCUMENTS

| | | | | |
|---|---|---|---|---|
| 2,092,559 A | * | 9/1937 | Runaldue | 200/83 F |
| 2,368,491 A | * | 1/1945 | Proctor | 429/79 |
| 2,421,822 A | * | 6/1947 | Wood | 248/543 |
| 2,635,838 A | * | 4/1953 | Branson | 248/562 |
| 3,243,154 A | * | 3/1966 | Dryden | 248/562 |
| 4,527,782 A | * | 7/1985 | Klann | 267/177 |
| 4,796,871 A | * | 1/1989 | Bauer et al. | 267/64.11 |

* cited by examiner

*Primary Examiner*—Melody M Burch
(74) *Attorney, Agent, or Firm*—Leong C. Lei (57) ABSTRACT

An assisting ejection device is provided for assisting ejection a hatch of a hatchback. The assisting ejection device includes spring-biased rod to act on the hatch. The spring is in a compressed condition when the hatch is closed so that when the hatch is released from the closed condition, the spring that is allowed to extend provides a springing force to help pneumatic cylinders that are originally provided to automatically lift the hatch to eject the hatch toward a flip-up position. The springing force effectively reduces the load applied to the pneumatic cylinders in opening the hatch so as to extend the service life of the pneumatic cylinders.

7 Claims, 9 Drawing Sheets

ASSISTING EJECTION DEVICE FOR HATCH OF HATCHBACK

BACKGROUND OF THE INVENTION (a) Technical Field of the Invention

The present invention relates generally to the field of automobile, and in particular a hatchback having an assisting ejection device for the hatch to facilitates opening operation of the hatch and extension of the service life of the hatch mechanism.

(b) Description of the Prior Art

A hatchback is an automobile having a cargo space integrated with a passenger cabin and is accessed through a hatch or a flip-up window. The cargo space of the hatchback is different from that of a truck and must be accessed by flipping upward the hatch that is hinged to a frame of a tail gate of the automobile.

Figure 1:
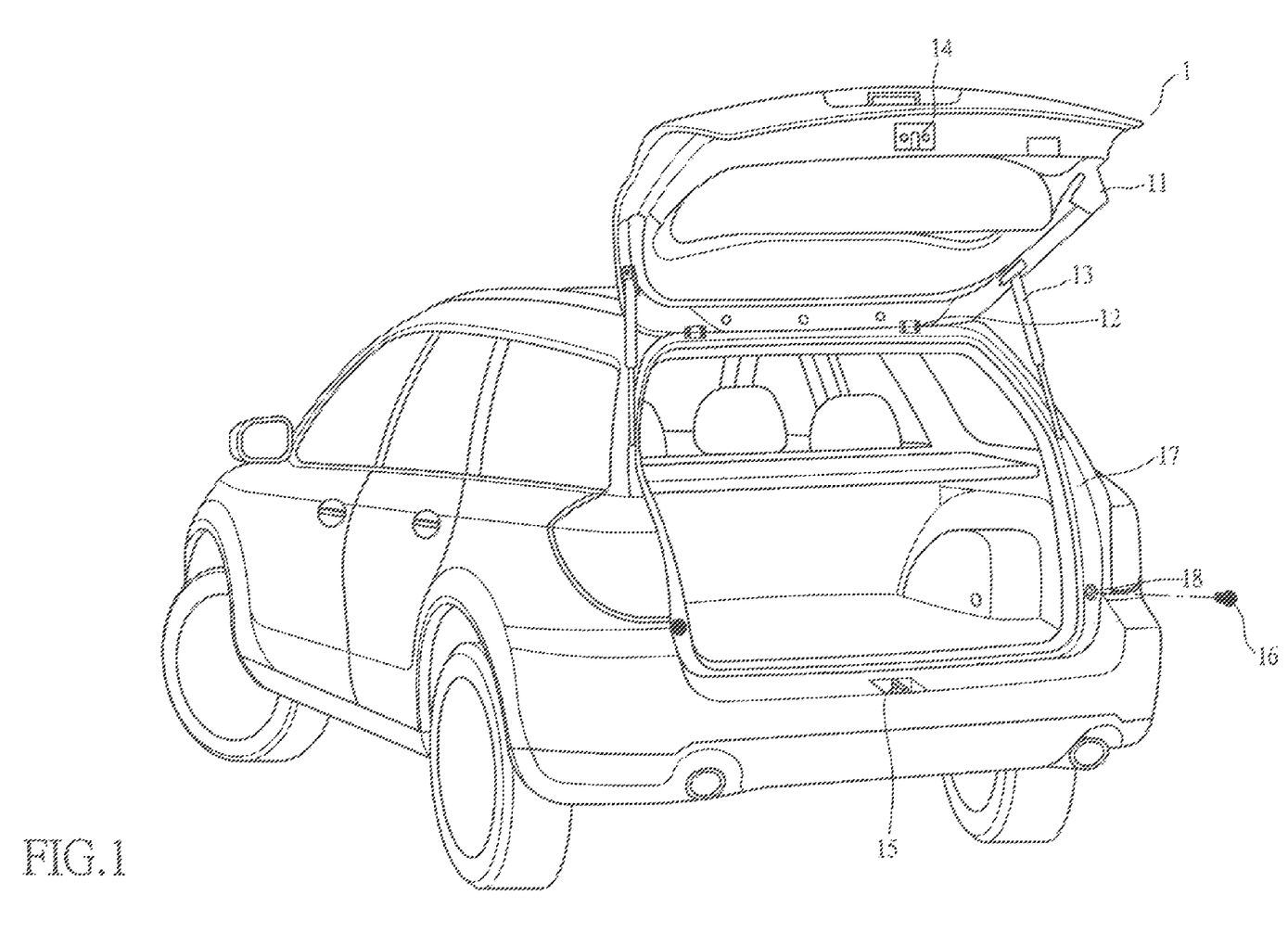
FIG. 1 is a perspective view of a conventional hatchback having a hatch in a lifted condition.
Figure 2:
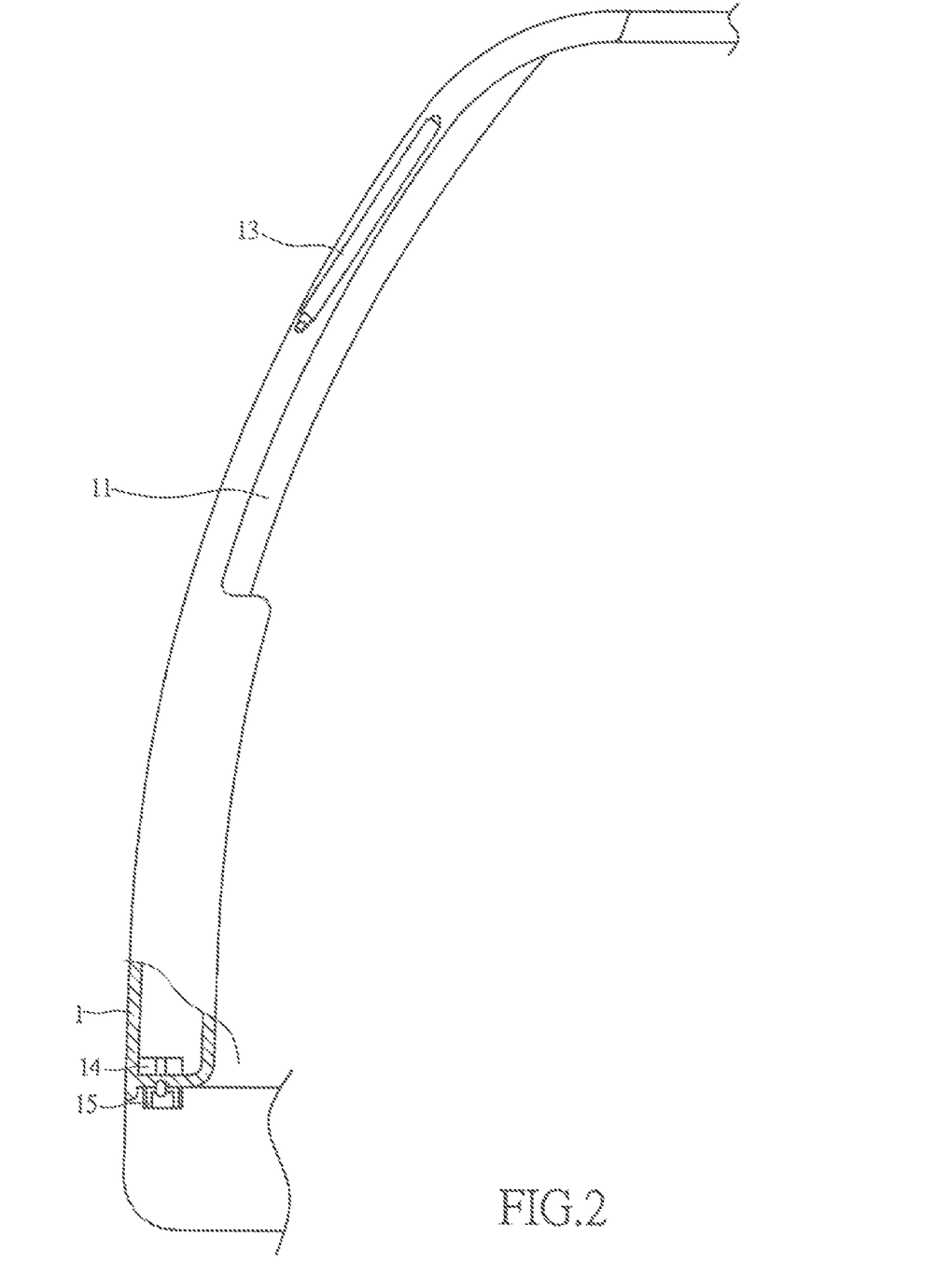
FIG. 2 is a side elevational view, partially broken, of the hatch of the hatchback.

FIGS. 1 and 2 of the attached drawings illustrate a hatchback having a hatch, designated at 1, having an upper edge pivotally connected to a tail gate frame 11 of the hatchback by hinges 12. Two pneumatic cylinders 13 are arranged on opposite sides of the hatch 1 and have opposite ends pivoted to opposing portions of the hatch 1 and the rail gate frame 11. A lock 14 is arranged at a lower edge of the hatch 1 and is releasably engageable with a hook 15 provided on the rail gate frame 11 to selectively secure the hatch 1 to the tail gate frame 11. The lock 14 can be disengaged from the hook 15 to release the hatch 1 and the pneumatic cylinders 13 eject and force the hatch 1 away from the frame 11 to thereby flip the hatch upward. Dampers 16 are often provided between the hatch 1 and the frame 11. The dampers 16 are made of resilient material or having a resilient function. The steel plate 17 that constitutes the frame 11 is machined to form slots 18 in which the dampers 16 are received and retained. The dampers 16 serve to absorb the shock and impact induced when the hatch 1 is brought into contact with the frame 11 in closing the hatch 1.

The conventional arrangement of the hatch, however, suffers insufficient driving force provided by the pneumatic cylinders 13 to flip the hatch 1 up when the automobile has been used for a long time and parts of the automobile are thus subject to aging problems. The aging of the pneumatic cylinders 13 reduce the driving force acting upon the hatch 1 so that when the lock 14 is released, the hatch 1 cannot automatically move away from the frame 11 and manually flipping the hatch 1 has to be carried out.

Although the pneumatic cylinders 13, as being regular mechanical parts, are subject to limitation of service life, which is determined not only by the nature of the pneumatic cylinders 13 themselves, but also the operation cycle thereof. Excessive numbers and load of opening/closing the hatch 1 often leads to reduced life span of the hatch 1. Thus, the present invention is aimed to extend the service life of the hatch by reducing the load applied to the pneumatic cylinders.

SUMMARY OF THE INVENTION

The primary purpose of the present invention is to provide an assisting ejection device that provides additional ejection force that facilitates pneumatic cylinders to open a hatch of a hatchback so as to overcome the conventional drawbacks of insufficiency of hatch opening force from the pneumatic cylinders.

To achieve the above described goal of the present invention, an assisting ejection device is provided between a hatch and a tail gate frame of a hatchback. The assisting ejection device comprises a base, a rod, a spring and an enclosure. The base comprises tenon members that are resiliently fit into a slot defined in the hatchback to secure the assisting ejection device to the hatchback. The rod is fit through the spring and is movably coupled to the base. An end of the rod forms a retention section that extends beyond the base and engages a fastener to retain the rod to the base and to define a movement stroke of the rod with respect to the base. An opposite end of the rod, being biased by the spring, acts upon the hatch to help opening the hatch by the biasing force of the spring. The enclosure is in the form of a bellow having an open end fit over and enclosing the rod and the spring and attached to the base.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of prefered embodiments thereof, with reference to the attached drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 3:
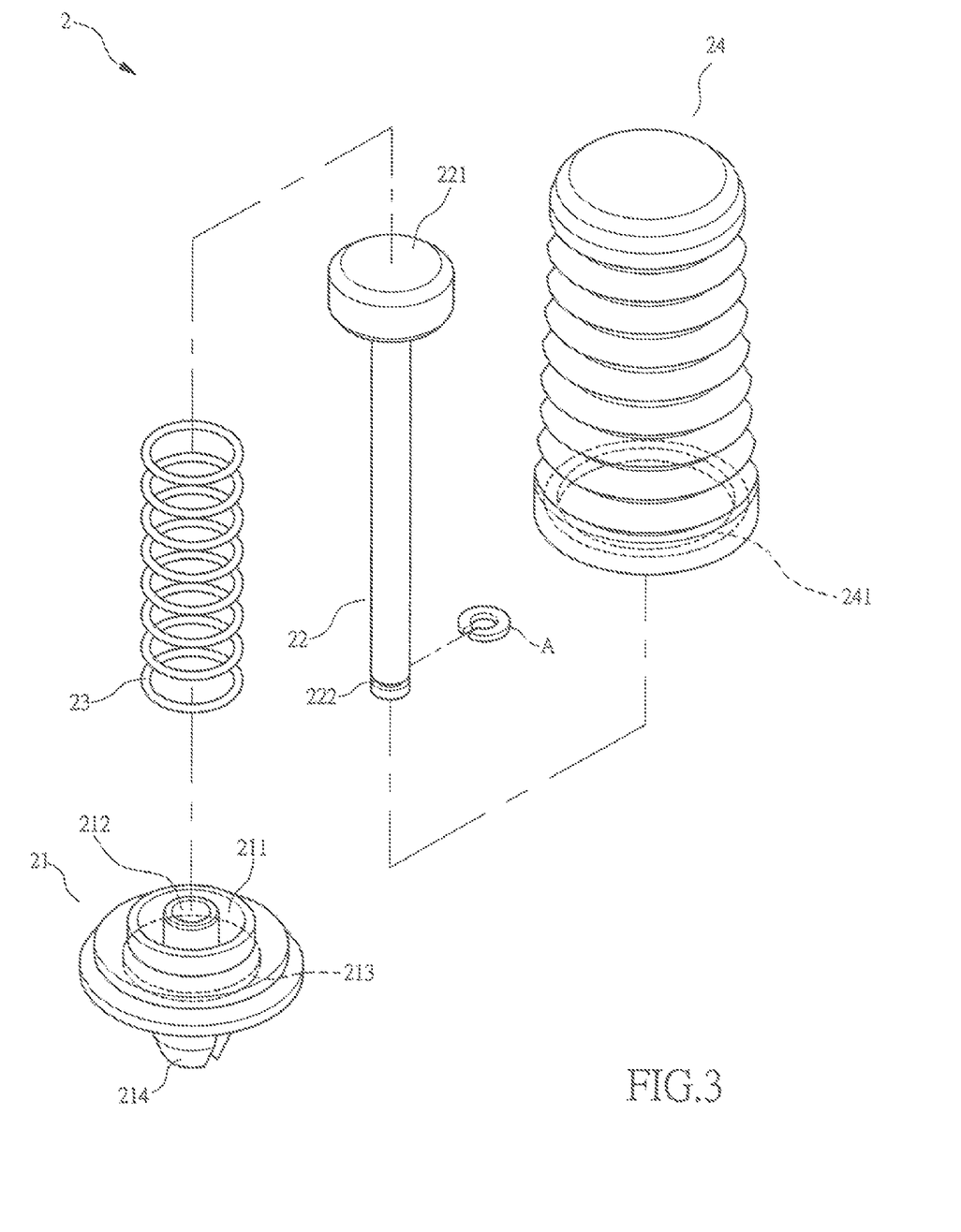
FIG. 3 is an exploded view of an assisting ejection device constructed in accordance with the present invention.
Figure 4:
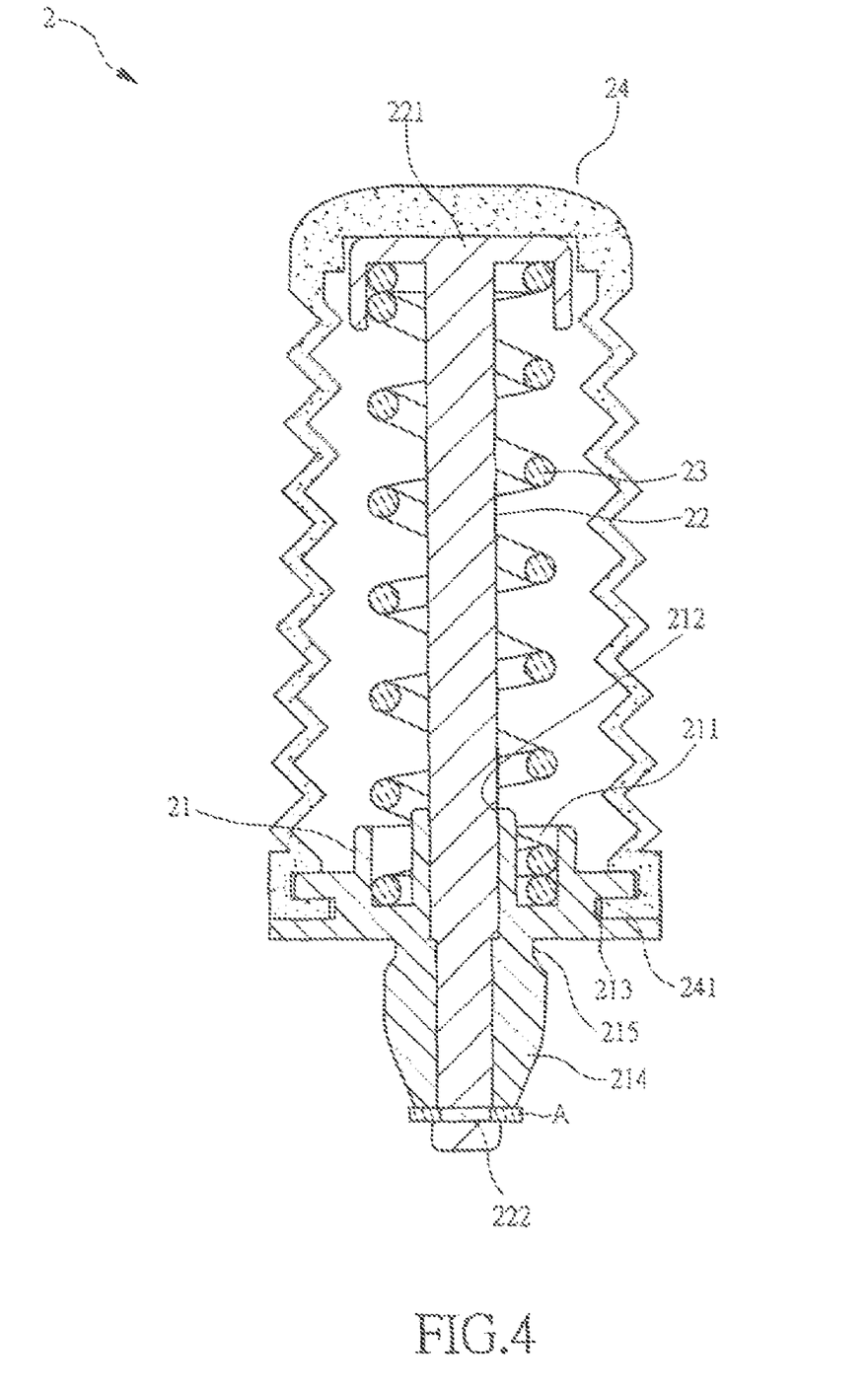
FIG. 4 is a cross-sectional view of the assisting ejection device of the present invention in an assembled form.

With reference to the drawings and in particular to FIGS. 3 and 4, an assisting ejection device constructed in accordance with the present invention, generally designated with reference numeral 2 is mounted to a tail gate of a hatchback to assist ejection of the hatch from the tail gate in opening the hatch. The assisting ejection device 2 in accordance with the present invention comprises a base 21, a rod 22, a spring 23 and an enclosure 24.

The base 21 has a top face on which an annular slot 211 is formed. The base 21 also defines a bore 212 at a center thereof. The base 21 also has a circumferential side face along which a circumferential groove 213 is formed. The base 21 has a bottom face, opposite to the top face, from which a plurality of tenon members 214 extends axially and arranged around an outer circumference of the bore 212. The tenon members 214 are configured to form recesses 215 located at the connection between the tenon members 214 and the bottom face of the base 21 and aligned with each other and extending in a circumferential direction.

The rod 22 has an upper end forming a cap 221 delimiting an annular slot around the rod 22 and a lower end forming a retention section 222, which in the embodiment illustrated comprises a circumferential groove.

The spring 23, which is a helical spring in the embodiment illustrated, has an outer diameter sized to substantially fit into the annual slot 211 of the base 21 and the annular slot delimited around the rod 22 by the cap 221 so as to retain the spring 23 between the cap 221 of the rod 22 and the top face of the base 21.

The enclosure 23 is made of a soft and resilient material in the form of a bellow having an open end and an opposite closed end. The open end of the bellow enclosure 23 forms a circumferential flange 241 that projects inward.

To assemble the assisting ejection device 2 of the present invention, the rod 22 is put through the spring 23 to be encompassed by the spring 23 and an end of the spring 23 is fit into the cap 221 of the rod 22. The lower end of the rod 22 is then inserted through the bore 212 of the base 21 so that the opposite end of the spring 23 is received into the annular slot 211 on the top face of the base 21. The rod 22 is forcibly pushed into the bore 212 of the base 21 to partially compress the spring 23, causing the lower end of the rod 22 to extend beyond the bottom face of the base 21 and the retention section 222 exposed outside the tenon members 214 that are provided on the bottom face of the base 21. A clip A is then fit into and engages with the circumferential groove of the retention section 222. The clip A is allowed to abut against free ends of the tenon members 214 when compressing force of the spring 23 is released. This secures the spring 23 to the base 21. Thereafter, the open end of the enclosure 24 is fit downward over, in sequence, the cap 221 of the rod 22 and the spring 23 to allow flange 241 of the enclosure 24 to engage the circumferential groove 213 of the base 21 thereby attaching the enclosure 24 to the base 21 and completing the assembling of the assisting ejection device 2.

Figure 5:
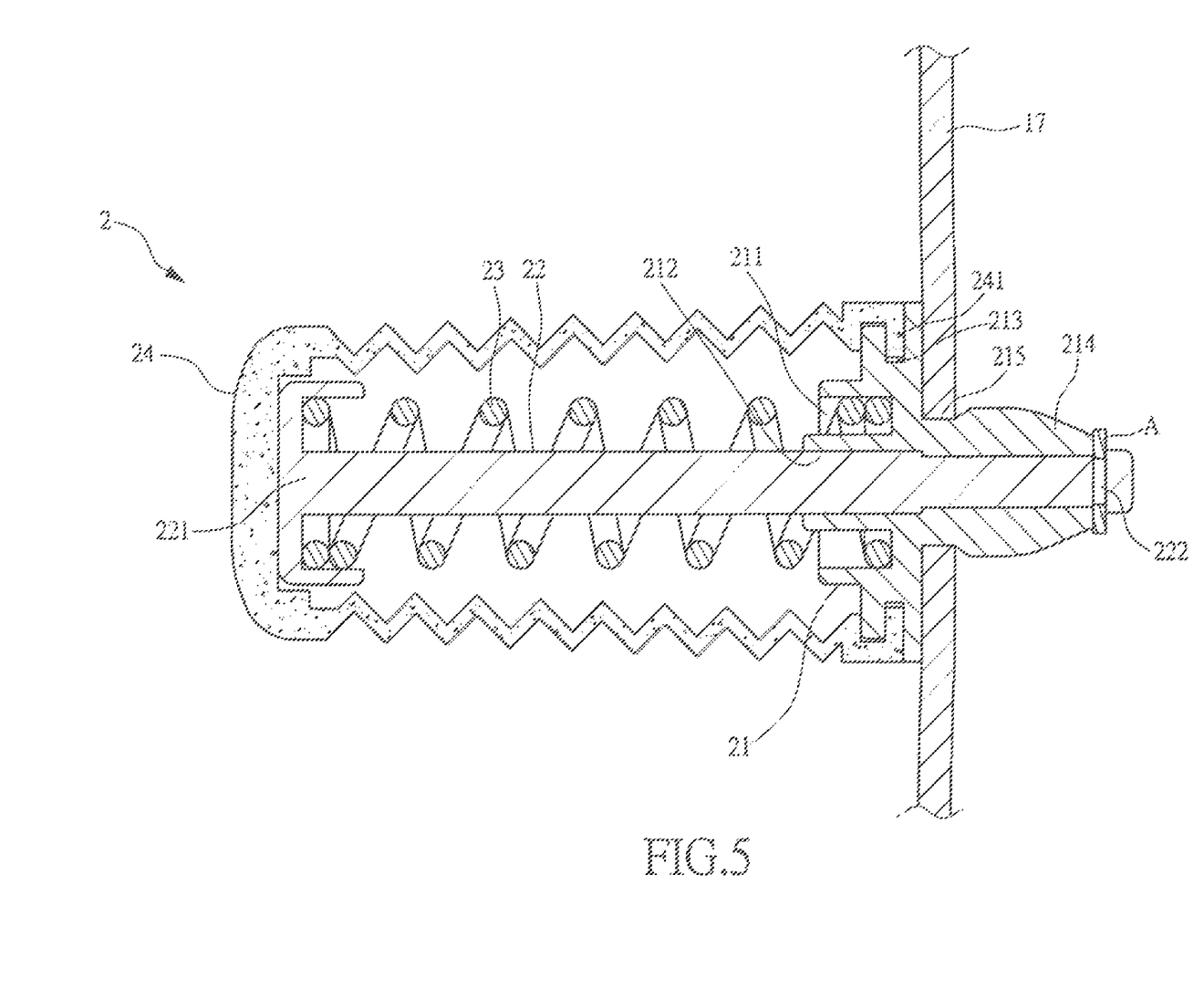
FIG. 5 is a cross-sectional view illustrating the assisting ejection device of the present invention installed on a hatchback.

Referring to FIG. 5, to install the assisting ejection device 2 to the hatch 1 or the tail gate frame 11 of a hatchback, an existing damper 16 that is originally mounted to the automobile is removed to expose the damper-mounting slot 18 that is defined in the steel plate 17 of the automobile. The tenon members 214 are put in alignment with the slot 18 and is then forced into the slot 18 by means of deformation facilitated by resilience thereof until the circumferentially extending recesses 215 of the tenon members 214 engage a circumference of the slot 18 to thereby retain the assisting ejection device 2 to the slot 18. The assisting ejection device 2 is thus installed on the hatch 1 or the tail gate frame 11 of the hatchback.

Figure 6:
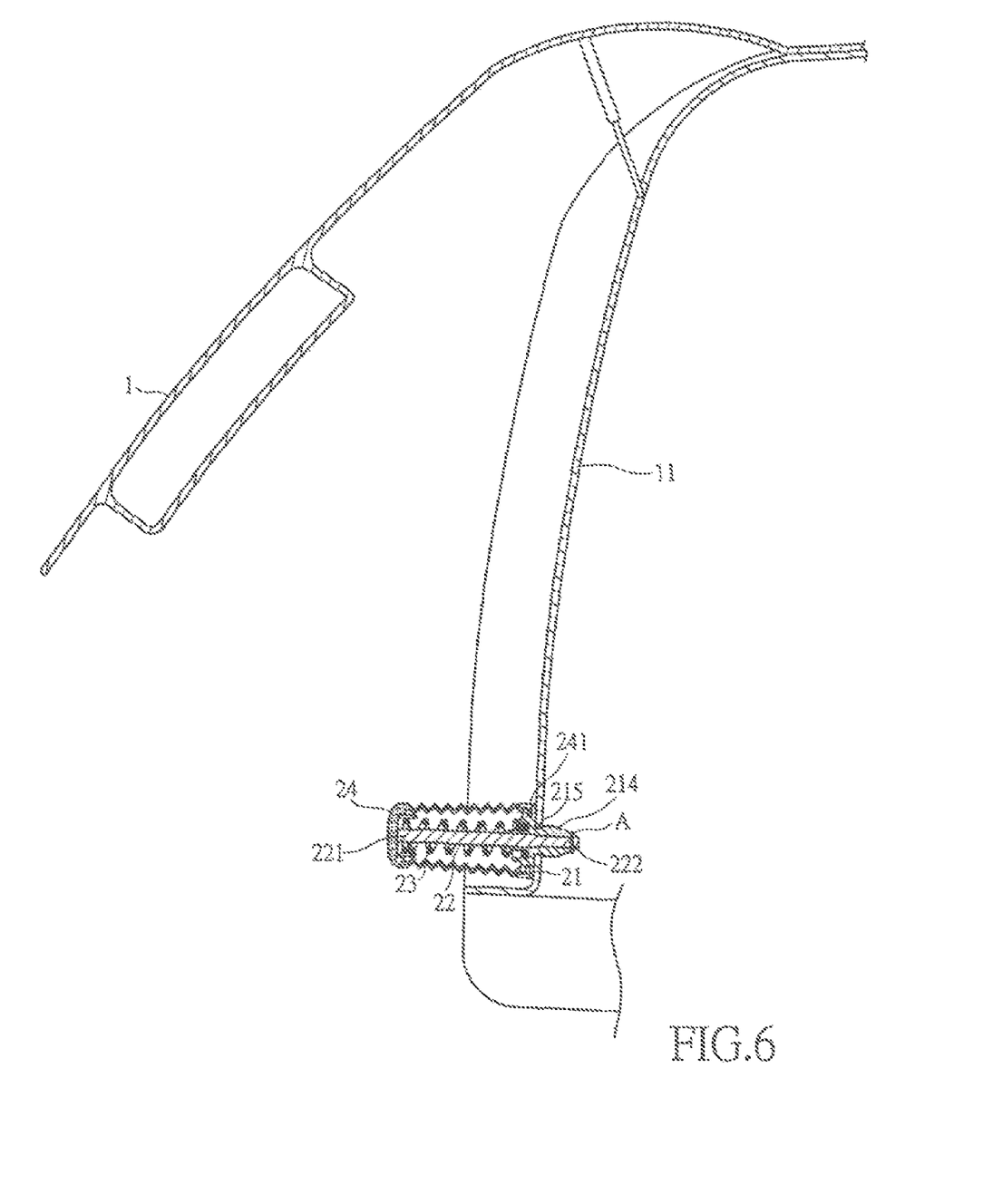
FIGS. 6 and 7 are cross-sectional views of a rear portion of the hatchback on which the assisting ejection device of the present invention is installed to respectively illustrate opening and closed conditions of the hatch for demonstrating the operation of the assisting ejection device of the present invention.
Figure 7:
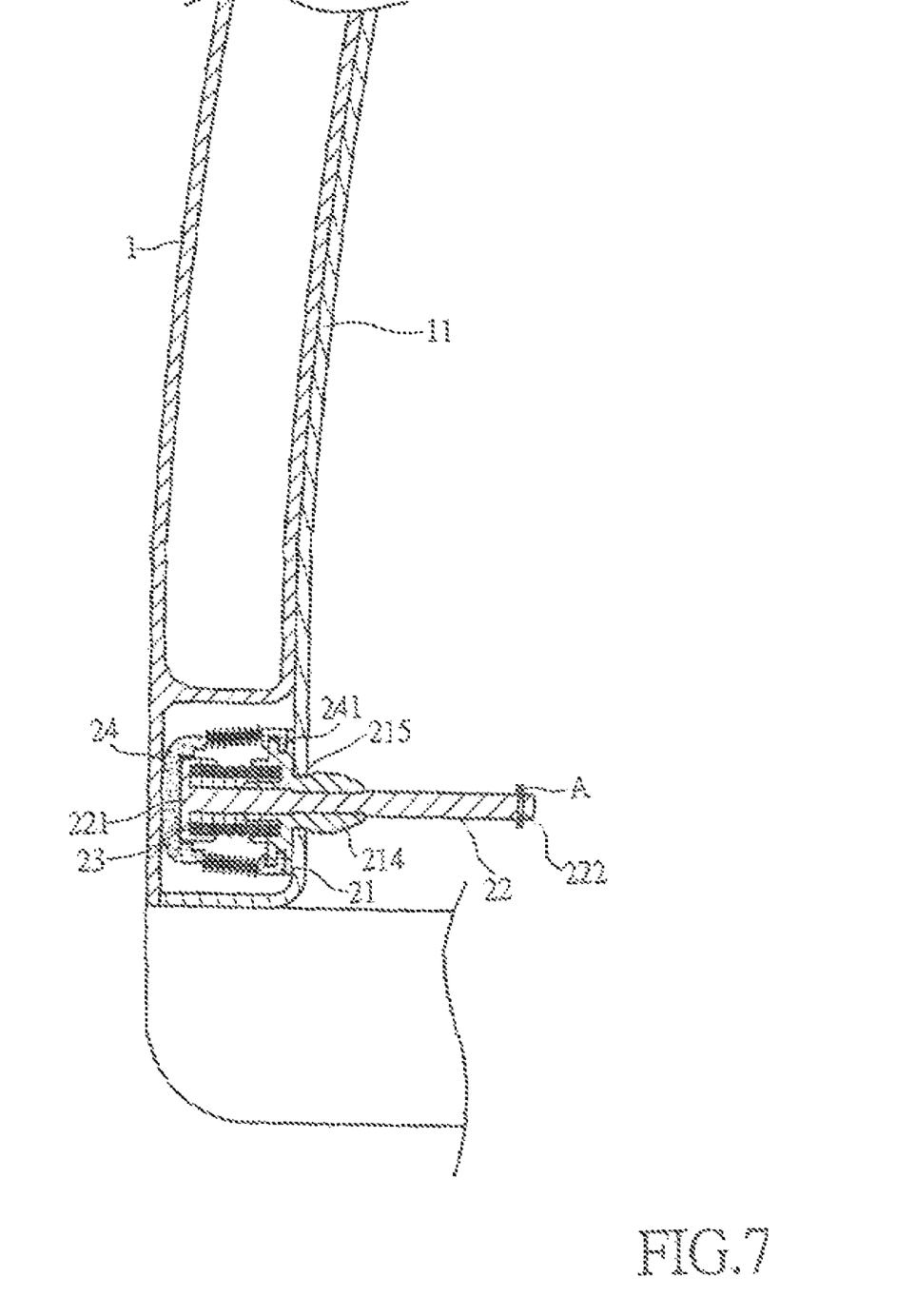

Also referring to FIGS. 6 and 7, when the hatch 1 is closed on the tail gate frame 11, the lock 14 of the hatch 1 engages the hook 15 of the tail gate frame 11 to secure the hatch 1 in the closed position. In the closed condition, the assisting ejection device 2 is pressed by the hatch 1 to move the rod 22 further into the bore 212 of the base 21 so that the spring 23 is compressed and potential energy is stored in the compressed spring 23.

When the lock 14 is unlocked and disengages from the hook 15 of the tail gate frame 11, the pneumatic cylinders 13 that are originally provided between the hatch 1 and the tail gate frame 11 gradually drives the hatch 1 away from the tail gate frame 11 and at the same time, the compressed spring 23 of the assisting ejection device 2 of the present invention is no longer constrained and the potential energy stored therein is immediately released and a springing force is induced to provide additional force for ejecting the hatch 1 away from the tail gate frame 11. The rod 22 is now allowed to move outward with the expansion of the spring 23 and the outward movement of the rod 22 is ultimately stopped by the clip A that is brought into contact with the tenon members 214 of the base 21 by the outward movement of the rod 22. In this open condition, the assisting ejection device 2 of the present invention is again ready for the next operation.

Figure 8:
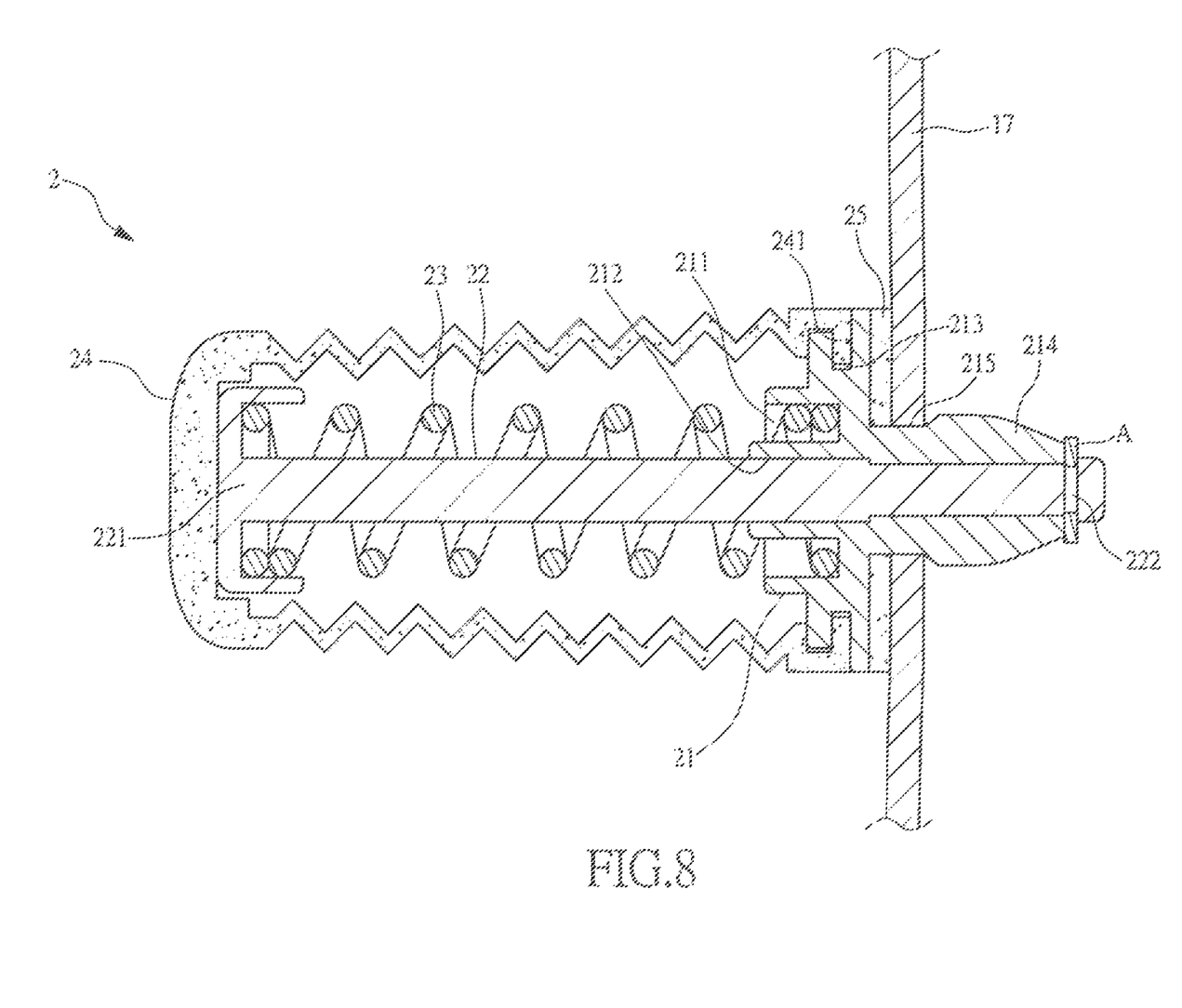
FIG. 8 is a cross-sectional view illustrating an assisting ejection device constructed in accordance with another embodiment of the present invention.

Also referring to FIG. 8, if necessary, a spring washer 25 is fit over the tenon members 214 and received in the circumferentially extending recesses 215 so that when the assisting ejection device 2 of the present invention is installed to the steel plate 17 of a body of the hatchback, the spring washer 25 is interposed between the bottom face of the base 21 and the steel plate 17 to effect tightness, sound absorption and shock reduction between the assisting ejection device 2 and the steel plate 17 of the automobile body.

Figure 9:
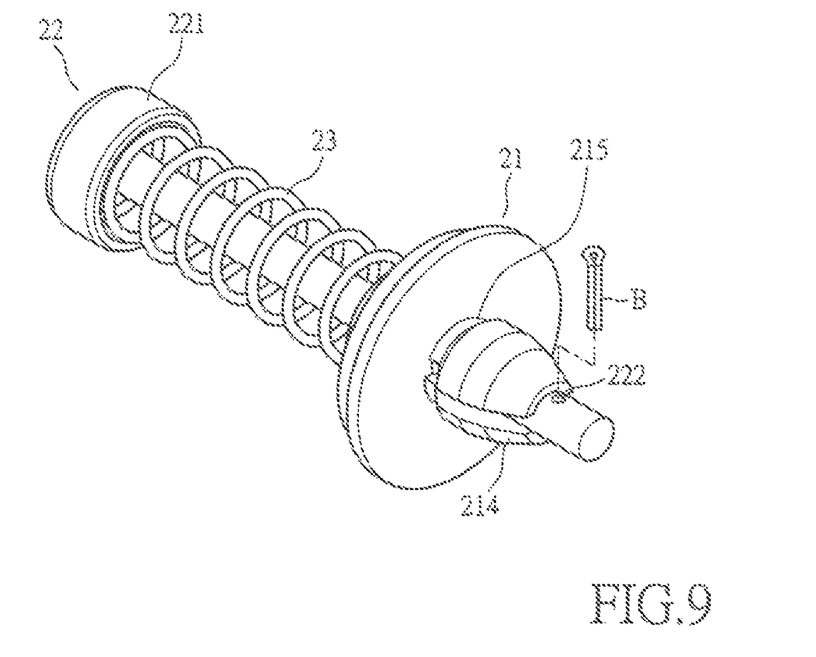
FIG. 9 is a perspective view illustrating an assisting ejection device constructed in accordance with a further embodiment of the present invention.
Figure 10:
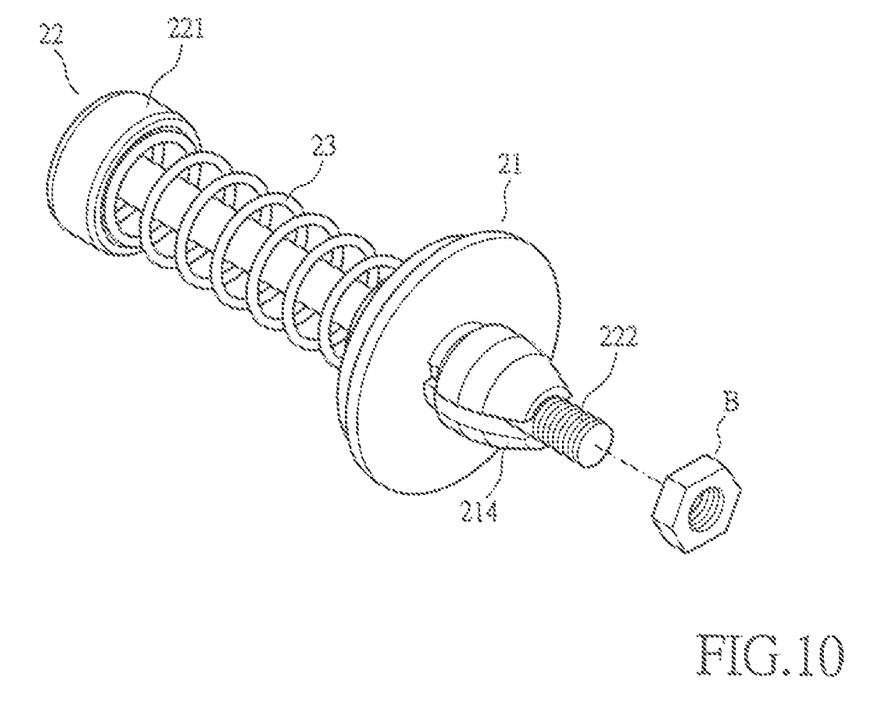
FIG. 10 is a perspective view illustrating an assisting ejection device constructed in accordance with yet a further embodiment of the present invention.

Referring to FIG. 9, which shows a modification of the assisting ejection device 2 of the present invention, the retention section 222 of the modified embodiment of the assisting ejection device 2 comprises a diametrically extending through hole, rather than a circumferential groove, and a cotter pin B can received through the hole to abut against the tenon members 214 of the base 21 for retention purposes. Alternatively, another modification of the assisting ejection device 2 of the present invention is illustrated in FIG. 10, wherein the retention section 222 of the rod 22 is formed with thread, which is engageable with a nut C that, similarly, abuts against the tenon members 214 of the base 21 for retention purposes.

To summarize, the assisting ejection device 2 of the present invention can be selectively installed in either the hatch or the tail gate frame of a hatchback and the springing force of the spring 23 of the assisting ejection device 2, when released from a compressed condition, helps the pneumatic cylinders to eject the hatch from the tail gate frame of the hatchback. Further, with the assistance force provided by the spring 23 of the assisting ejection device 2 of the present invention, the load of opening the hatch applied to the pneumatic cylinders can be reduced. Thus, the service life of the pneumatic cylinders 13 can be extended.

Although the present invention has been described with reference to the preferred embodiments thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An assisting ejection device adapted to mount to a hatchback for assisting ejection of a hatch of the hatchback, the assisting ejection device comprising:
    a base having a top face forming a first annular slot and a bottom face from which a plurality of tenon members extends, a bore defined through the base between the top and bottom faces and surrounded by the tenon members, the tenon members forming circumferentially extending recesses, the base having a circumferential side face in which a circumferential groove is defined;
    a rod having an upper end forming a cap that delimits a second annular slot and a lower end forming a retention section, the rod being received through the bore of the base with the retention section projecting beyond the tenon members that are formed on the bottom face of the base and engaging a fastener so that the fastener abuts against the tenon members; and
    a spring encompassing the rod and having opposite ends received in the first and second annual slots respectively.

2. The assisting ejection device as claimed in claim 1 further comprising an enclosure having a closed end and an opposite open end fit over and enclosing the base, the rod and the spring, the open end of the enclosure forming a flange engaging the circumferential groove formed along the circumferential side face of the base to fix the enclosure to the base.

3. The assisting ejection device as claimed in claim 1, wherein the retention section of the rod comprises through hole defined in the rod and wherein the fastener comprises a pin received in the through hole.

4. The assisting ejection device as claimed in claim 1, wherein the retention section of the rod comprises a thread formed on the rod and wherein the fastener comprises a nut engageable with the thread.

5. The assisting ejection device as claimed in claim 1, wherein the retention section of the rod comprises a circumferential groove defined in the rod and wherein the fastener comprises a clip received in the groove.

6. The assisting ejection device as claimed in claim 1, wherein the assisting ejection device is mounted in a slot defined in a plate portion of the hatchback by having the circumferentially extending recesses of the tenon members receiving and engaging a flange of the slot of the plate portion of the hatchback.

7. The assisting ejection device as claimed in claim 6 further comprising a spring washer interposed between the base and the plate portion of the hatchback.

* * * * *